J. A. WALDORF.
METALLIC PIPE COVERING.
APPLICATION FILED OCT. 20, 1920.

1,383,680.

Patented July 5, 1921.

John A. Waldorf
Inventor
By Lloyd Garrison
Attorney

UNITED STATES PATENT OFFICE.

JOHN A. WALDORF, OF SALT LAKE CITY, UTAH.

METALLIC PIPE-COVERING.

1,383,680. Specification of Letters Patent. Patented July 5, 1921.

Application filed October 20, 1920. Serial No. 418,260.

*To all whom it may concern:*

Be it known that I, JOHN A. WALDORF, a citizen of the United States, residing at Salt Lake City, in the county of Salt Lake and State of Utah, have invented new and useful Improvements in Metallic Pipe-Coverings, of which the following is a specification.

My invention pertains to that class of devices the object of which is to prevent the transfer of heat to and from pipes used for carrying refrigerating substances, steam, hot water, and other substances which must be maintained at a temperature considerably different than that of the surrounding air.

Most of the devices now used for this purpose are composed of porous substances such as magnesia, cork, asbestos, and hair felt and are molded or plastered on the pipe. Such substances are insulators against the transfer of heat by virtue of the air which they entrap within their structure, but when subjected to moisture, particularly the moisture of the surrounding air in the case of coverings for refrigeration pipes, become damp and lose their heat insulating qualities to a considerable extent. Also, in the case of refrigerating systems, the alternate freezing and thawing due to the change in difference between the outside and inside temperatures causes the insulation to deteriorate and eventually crack; the pipe covering is continually covered with a layer of frost which, when melting, drips considerably; and the efficiency of the insulation is considerably lowered. My invention is designed to overcome these difficulties by the use of a multicellular metal pipe covering which is easily and cheaply manufactured, is easily installed, and which by its construction prevents the circulation of the outside air around those surfaces which reach the freezing temperature.

In the accompanying drawings Figure 1 is a side elevation of the pipe covering partially cut away to show the construction and method of mounting.

Figure 1:
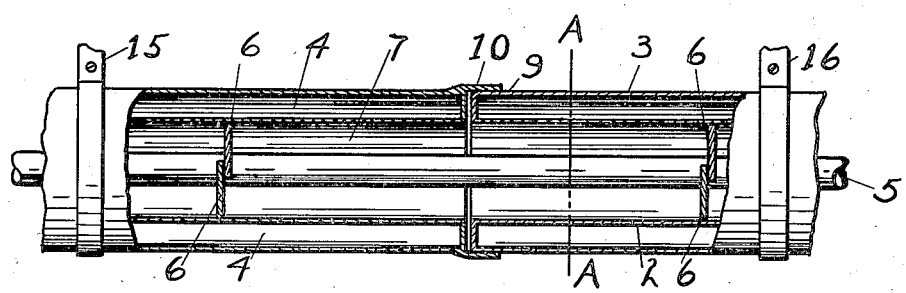
Figure 2:
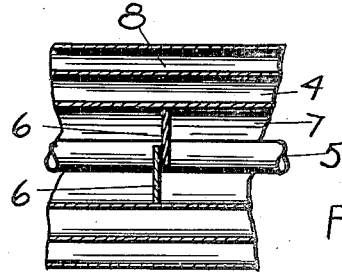
Fig. 2 shows the construction in which more than one hermetically sealed air or vacuum space is used.
Figure 3:
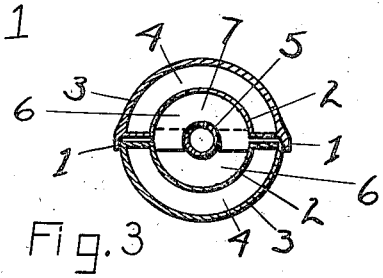
Fig. 3 is section A—A of Fig. 1.

The device is composed of semi-tubular casings, Fig. 3, the upper one of which has the flanges 1 which spread and engage the lower portion. Each portion is composed of an inner casing 2 and an outer casing 3, which inclose between them dry air in the hermetically sealed space 4. The casings are made of metal which is of sufficient strength to resist the pressure due to varying barometric pressures that may occur at various places of use. The covering is centered about pipe 5 by the use of spacers 6. These spacers overlap and are preferably so proportioned that they cause a slight space to exist between the upper and lower sections, thus insuring close contact of the spacer and pipe and preventing circulation of air along the pipe when the latter is placed vertically. This arrangement provides two air spaces, 7, that about the pipe, and the hermetically sealed space 4. Two spaces are usualy sufficient, but if it is desired, more may be added as shown in Fig. 2. Also if it is so desired, one or more of these, as 8, may be made a permanent vacuum when manufactured and thus somewhat increase the heat insulating qualities over those produced by the use of dry air. The covering is constructed in sections of any desired length with male and female joints 9 and 10 at opposite ends and is easily and cheaply manufactured.

Figure 4:
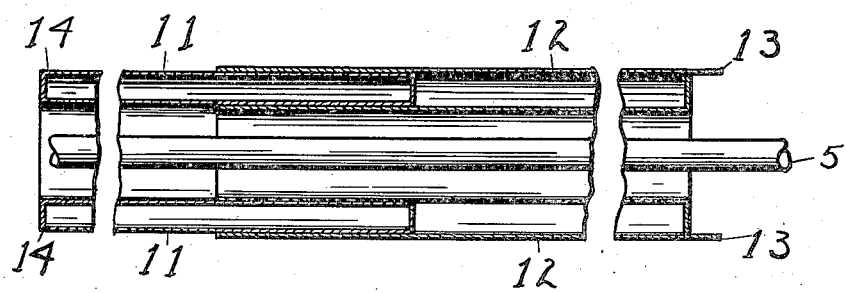
Fig. 4 is a section of the telescoping joint.

In order to make the covering continuous at bends and fittings it is necessary to use a telescoping joint as shown in Fig. 4. This is accomplished by making two sections 11 and 12 which telescope as shown and permit the necessary adjustment of length between the adjacent section of covering and the fitting. Section 12 is equipped with a female joint 13 and section 11 with a male joint 14 for connection to the standard sections.

Figure 5:
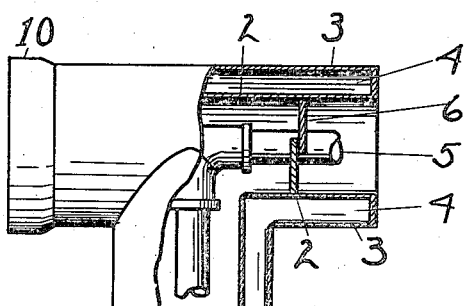
Fig. 5 is a partial section illustrating the covering for a fitting.

Fig. 5 illustrates a fitting for use with an ordinary T. The construction is similar to the construction of the covering for the ordinary pipe.

The portions of the covering may be held together by the pipe hangers 15 and 16 or may be fastened with any similar device when sections lie between hangers. Also it is advisable to use cement to seal the joints and prevent air reaching the pipe from outside the covering.

The use of hermetically sealed air or vacuum chambers precludes that circulation of air and ingress of moisture which is so destructive of the ordinary insulation, or insulation using a combined air space and porous insulation. Also the vacuum chambers being sealed at the time of manufacture removes the necessity and expense of air tight fittings and a vacuum pump as is required in some devices; and the elasticity of the metal prevents breakage of insulation where pipes are subjected to bending stresses as is the case on shipboard, or where the pipe is subject to considerable vibration.

What I claim as my invention is:

1. A pipe covering composed of semi-tubular metal sections containing hermetically sealed air spaces, spacers to center said sections with reference to the pipe covered, and semi-tubular telescope joints to connect said sections at places requiring odd lengths of section.

2. A pipe covering composed of concentric semi-tubular metal sections, hermetically sealed air spaces contained between said sections, spacers to center said sections with reference to the pipe covered, and semi-tubular telescope joints to connect said sections at places requiring odd lengths of section.

3. A pipe covering composed of concentric semi-tubular metal sections, hermetically sealed vacuum spaces between said sections, spacers to center said sections with reference to the pipe covered, and semi-tubular telescope joints to connect said sections at places requiring odd lengths of section.

4. A pipe covering composed of a series of concentric semi-tubular metal sections containing between them a series of hermetically sealed air and vacuum spaces, spacers to center said sections with reference to the pipe covered, and semi-tubular telescope joints to connect said sections at places requiring odd lengths of section.

In witness whereof I have set my hand.

JOHN A. WALDORF.

Witnesses:
W. G. HARRISON,
D. E. TRACY.